United States Patent
Kinoshita et al.

(10) Patent No.: US 6,622,112 B2
(45) Date of Patent: Sep. 16, 2003

(54) TRACKING APPARATUS AND METHOD CAPABLE OF PRESUMING POSITION AND VELOCITY OF AN OBJECT WITH HIGH PRECISION

(75) Inventors: Ken Kinoshita, Minato-ku (JP); Mamoru Yamashita, Minato-ku (JP); Tadashi Nakamura, Minato-ku (JP)

(73) Assignees: NEC Corporation, Tokyo (JP); Nippon Avionics Co., Ltd., Tokyo (JP)

( * ) Notice: Subject to any disclaimer, the term of this patent is extended or adjusted under 35 U.S.C. 154(b) by 0 days.

(21) Appl. No.: 10/054,933

(22) Filed: Jan. 25, 2002

(65) Prior Publication Data

US 2002/0193900 A1 Dec. 19, 2002

(30) Foreign Application Priority Data

Jan. 26, 2001 (JP) ......................................... 2001-018110

(51) Int. Cl.[7] ............................................... G01S 13/66
(52) U.S. Cl. ...................... 702/150; 702/159; 701/301; 700/251; 340/70
(58) Field of Search .................................. 702/150, 159, 702/142; 700/251, 253; 368/10; 342/70, 71; 701/301

(56) References Cited

U.S. PATENT DOCUMENTS 6,172,941 B1 * 1/2001 Bieramperl ................... 368/10
6,420,997 B1 * 7/2002 Cong ............................ 342/70

* cited by examiner

Primary Examiner—Kamini Shah
(74) Attorney, Agent, or Firm—Sughrue Mion, PLLC

(57) ABSTRACT

In a tracking apparatus for tracking an object by the use of a plurality of detecting data sets supplied from a detecting device, a velocity presuming portion is provided together with a position presuming portion. The position presuming portion finds a presumed position of the object at the latest detecting time of the detecting data sets by the use of the latest detecting time and regression curves found on the basis of the detecting data sets. The velocity presuming portion finds a presumed velocity of the object at the latest detecting time by the use of the regression curves and at least one of former detecting times different from the latest detecting time.

20 Claims, 9 Drawing Sheets

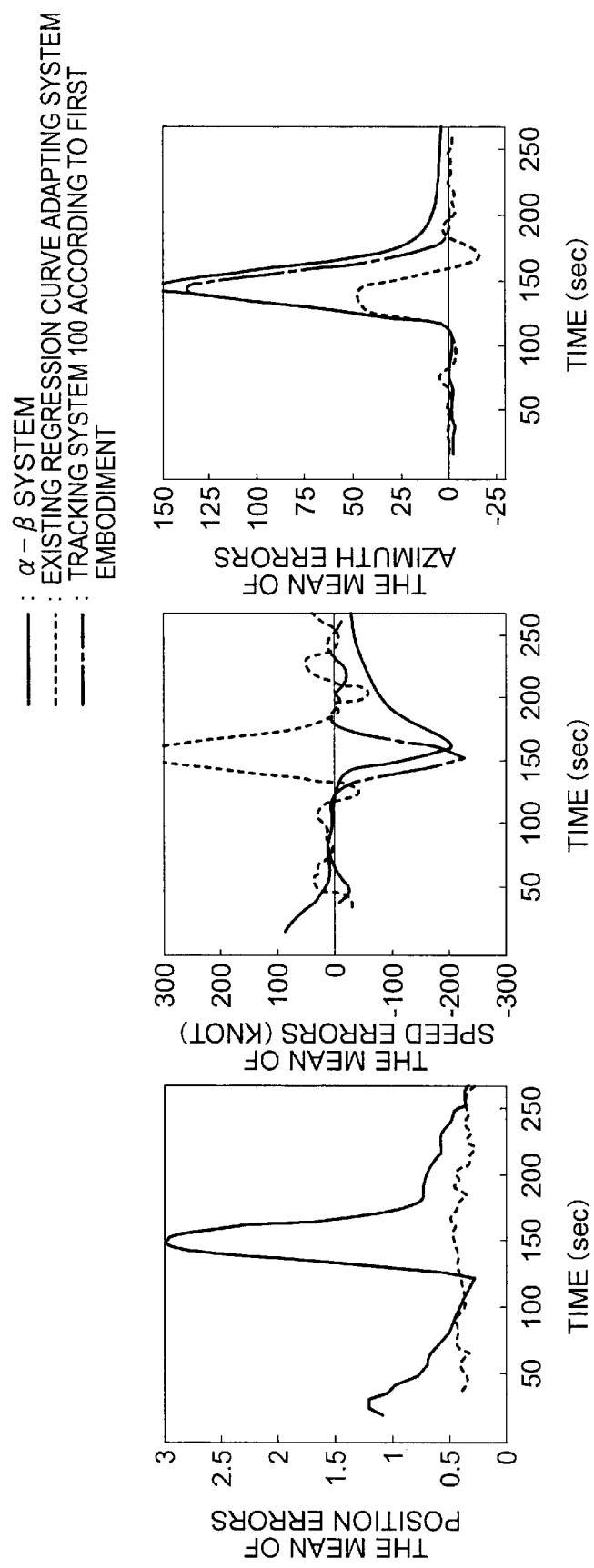

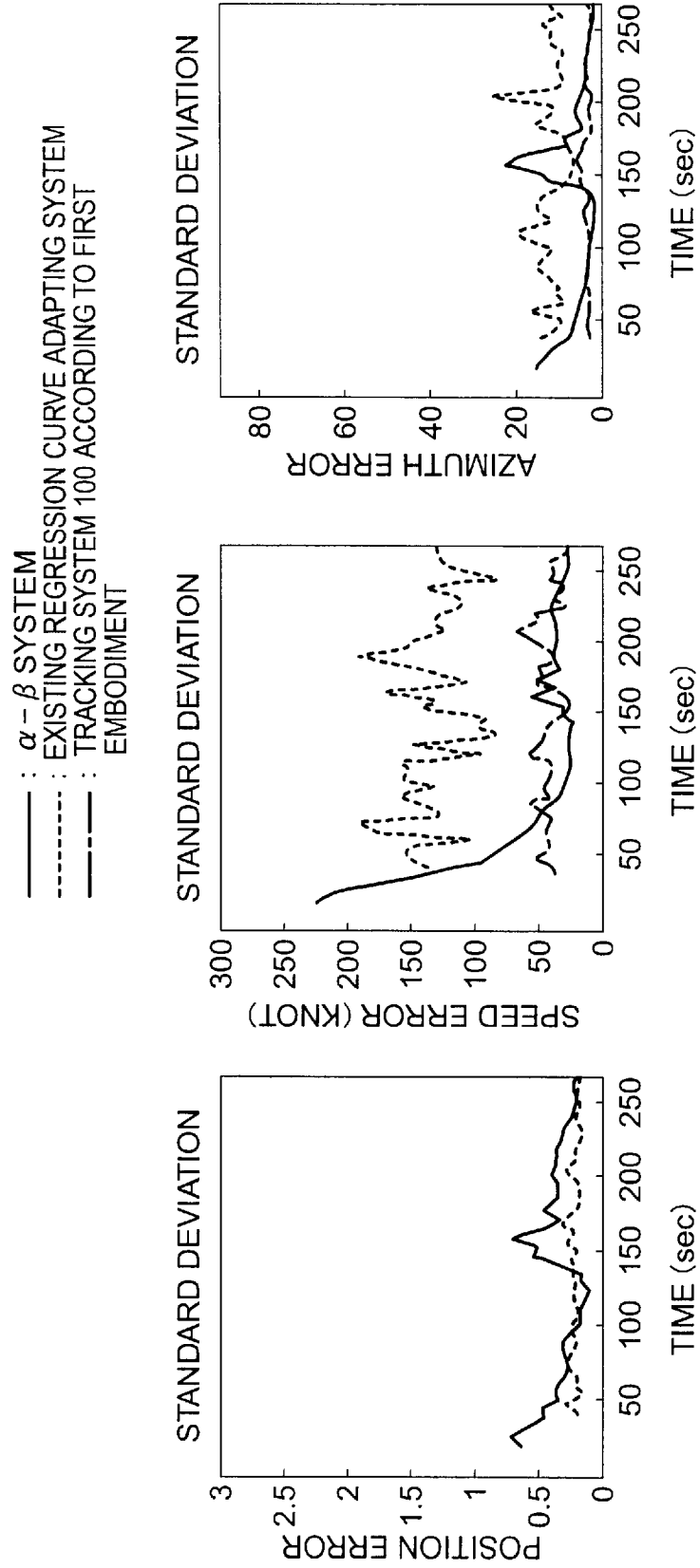

TRACKING APPARATUS AND METHOD CAPABLE OF PRESUMING POSITION AND VELOCITY OF AN OBJECT WITH HIGH PRECISION

BACKGROUND OF THE INVENTION

This invention relates to a tracking apparatus and method for tracking an object such as an aircraft and, in particular, to improvement thereof.

A tracking apparatus (or a tracking filter) is coupled with a detecting or sensing device such as a radar set. The detecting device periodically or successively detects a position of an object and produces a radar data set representative of position information of the object. The tracking apparatus calculates (or presumes) more correct tracking data representing the position (i.e. X and Y coordinates), velocity (i.e. a speed and an azimuth or a bearing angle) and so on of the object on the basis of the position information supplied from the detecting device.

As a conventional tracking apparatus, an α-β system is well known. The α-β system has tracking precision which is comparatively high when the object linearly moves at a uniform speed. However, the α-β system has a problem that the tracking precision remarkably deteriorates when the object changes its traveling direction quickly (or when a sharp turn is made by the object).

To solve the problem, a proposal has been made about another system having high tracking precision even if the object changes its traveling direction quickly. The proposed tracking system receives the radar data sets successively supplied from the radar set. Each of the radar data set represents a position (or X-Y coordinates) of the object on a predetermined X-Y coordinate system and the detecting time at which the position is detected by the radar set. The tracking system finds first and second regression functions which are individually corresponding to time variations of the X coordinate and the Y coordinate on the predetermined X-Y coordinate system by the use of a plurality of the radar data sets. The first and the second regression functions comprise quadratic functions of time. By the use of the first regression function, the tracking system further finds a presumed X coordinate and its changing rate at the latest detecting time of the detected data sets. The changing rate of the presumed X coordinate is equal to an inclination of a first regression curve of the first regression function at the latest detecting time and corresponds to a speed of the object along a direction of an X axis of the predetermined X-Y coordinate system. Similarly, the tracking system finds a presumed Y coordinate and its changing rate at the latest detecting time by the use of the second regression function. The changing rate of the presumed Y coordinate is equal to an inclination of a second regression curve of the second regression function at the latest detecting time and corresponds to a speed of the object along a direction of a Y axis of the predetermined X-Y coordinate system.

Additionally, such tracking system is called hereinafter a regression curve adapting system.

The existing regression curve adapting system can more precisely presume the position of the object in comparison with the conventional α-β system. However, the existing regression curve adapting system has a problem that the velocity presuming precision is lower than that of the α-β system when the object changes its traveling direction quickly.

SUMMARY OF THE INVENTION

It is therefore an object of this invention to provide a tracking apparatus which can precisely find coordinates and velocity of an object.

Other object of this invention will become clear as the description proceeds.

According to the aspect of this invention, a tracking apparatus is for tracking an object by the use of a plurality of detecting data sets. The detecting data sets are successively supplied from a detecting device. The tracking apparatus finds a presumed position and a presumed velocity of the object at the latest detecting time of the detecting data sets to track the object. The tracking apparatus comprises a regression curve calculating portion to find two regression functions individually corresponding to time variation of X and Y coordinates of the object on a predetermined X-Y coordinate system by the use of the detected data sets. A position presuming portion is connected to the regression curve calculating portion and finds the presumed position by the use of the regression functions and the latest detecting time. A velocity presuming portion is connected to the regression curve calculating portion and finds the presumed velocity by the use of the regression functions and at least one of the other detecting times of the detected data sets.

According to another aspect of this invention, a tracking method is for tracking an object by the use of a plurality of detecting data sets. The detecting data sets are successively supplied from a detecting device and finds a presumed position and a presumed velocity of the object at the latest detecting time of the detecting data sets. The tracking method comprises the steps of finding two regression functions individually corresponding to time variation of X and Y coordinates of the object on a predetermined X-Y coordinate system by the use of said detected data sets, finding the presumed position by the use of the regression functions and the latest detecting time, and finding the presumed velocity by the use of the regression functions and at least one of the other detecting times of the detected data sets.

BRIEF DESCRIPTION OF THE DRAWING

FIGS. 12A–12C are graphs for describing that the tracking apparatus of FIG. 7 is superior to the conventional and the existing tracking apparatus; and FIGS. 13A–13C are graphs for describing that the tracking apparatus of FIG. 7 is superior to the conventional and the existing tracking apparatus.

DESCRIPTION OF THE PREFERRED EMBODIMENTS

Referring to FIGS. 1 to 6, description will be at first directed to an existing tracking apparatus of a regression curve adapting system for a better understanding of this invention.

Figure 1:
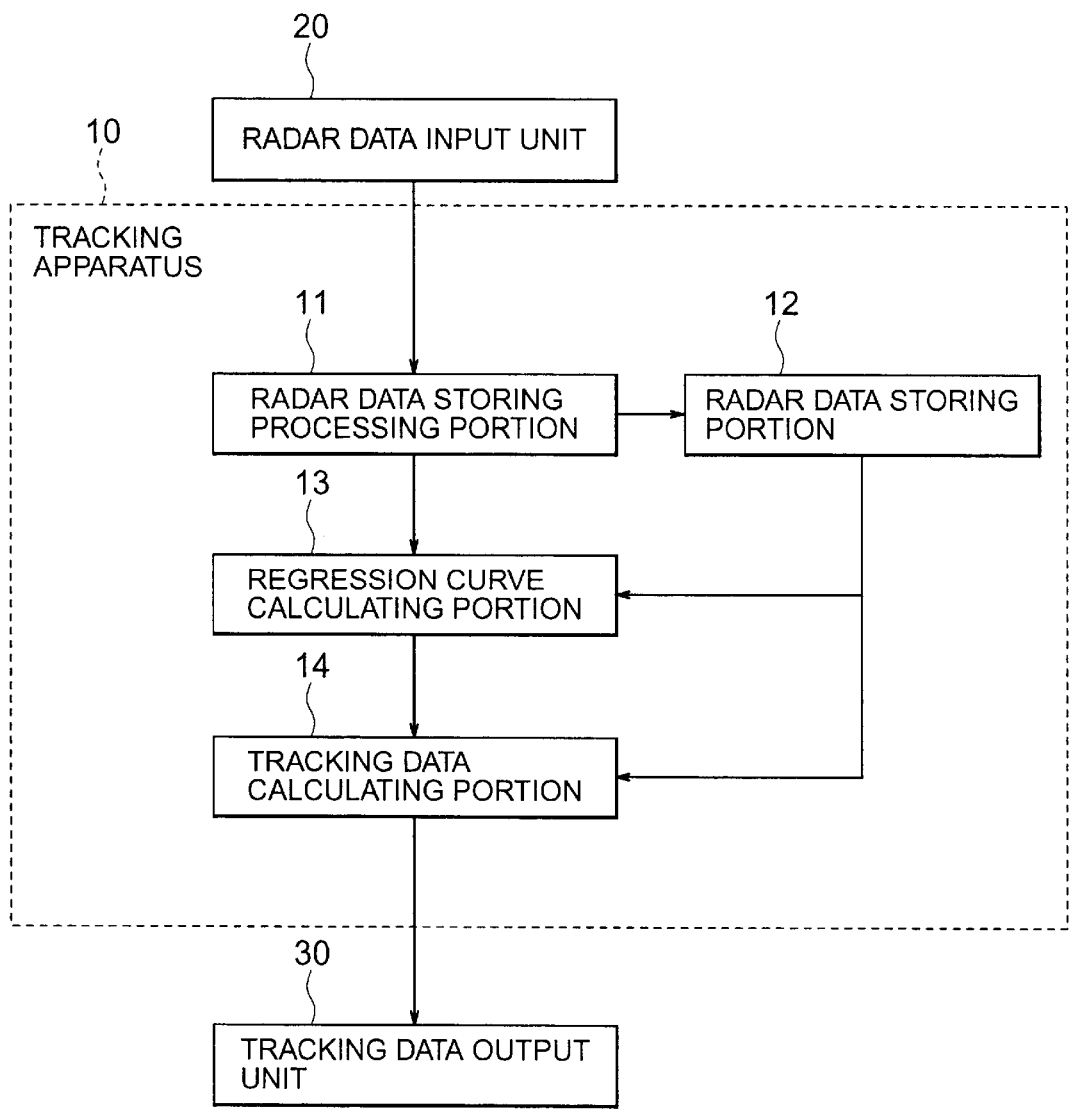
FIG. 1 is a block diagram of an existing tracking apparatus of a regression curve adapting system.
Figure 2:
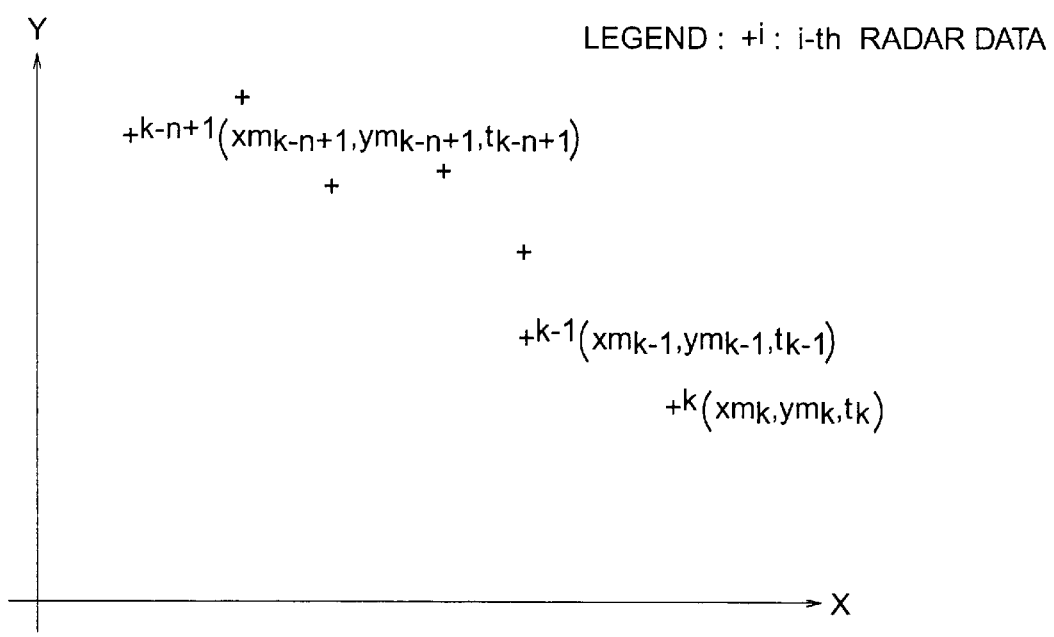
FIG. 2 shows X and Y coordinates, which are represented by detected data sets, of an object on a predetermined X-Y coordinate system.

In FIG. 1, the existing tracking apparatus 10 comprises a radar data storing processing portion 11, a radar data storing portion 12 connected to the radar data storing processing portion 11, an regression curve calculating portion 13 connected to both of the radar data storing processing portion 11 and the radar data storing portion 12, and a tracking data calculating portion 14 connected to both of the radar data storing portion 12 and the regression curve calculating portion 13.

The tracking apparatus 10 is connected between a radar data input unit or device 20 and a tracking data output unit or device 30. That is, the radar data storing processing portion 11 is connected to the radar data input unit 20 while the tracking data calculating portion 14 is connected to the tracking data output unit 30.

The radar data input unit 20 may comprises either a radar set or a receiver set. If the radar data input unit 20 comprises the radar set, it periodically or successively detects a position (or X-Y coordinates) of an object or target such as an aircraft and produces a radar data set which includes detected position information and the detecting time information.

On the other hand, if the radar data input unit 20 comprises the receiver set it receives the radar data set transmitted from the radar set. In any case, the radar data input unit 20 successively supplies the radar data set to the radar data storing processing portion 11. Herein, the radar data set includes, as the detected position, X and Y coordinates $xm_i$ and $ym_i$ of the object on a predetermined X-Y coordinate system and, as the detecting time information, a detecting time $t_i$ at which the X and the Y coordinates $xm_i$ and $ym_i$ are detected. The letter "i" (i: natural number) represents a serial number for distinguishing each radar data set from other radar data sets.

The radar data storing processing portion 11 makes the radar data storing portion 12 store the radar data set supplied from the radar data input unit 20 whenever it receives the radar data set In this time, the radar data storing processing portion 11 operates so that n (n: natural number) of later radar data sets are stored in the radar data storing portion 12 except for a starting period of the tracking apparatus. That is, when the number of the radar data sets stored in the radar data storing portion 12 is smaller than n, the radar data storing portion 12 simply stores the radar data set (hereinafter referred to as a latest or new data set) supplied from the radar data storing processing portion 11. When the number of the radar data sets stored in the radar data storing portion 12 is equal to n, the radar data storing portion 12 deletes the oldest one of the radar data sets stored therein and stores the latest radar data set. For instance, when the latest data set is a k-th (i=k≧n) radar data set, the radar data storing portion 12 stores n of the radar data sets from the k−n+1-th to the k-th. Hereinafter, the i-th radar data set is represented by "($xm_i$, $ym_i$, $t_i$)". For example, "($xm_k$, $ym_k$, $t_k$)" represents the k-th radar data set while "($xm_{k-n+1}$, $ym_{k-n+1}$, $tm_{k-n+1}$)" represents the k−n+1-th radar data set.

In addition, the radar data storing processing portion 11 notifies the regression curve calculating portion 13 of receiving the latest radar data set whenever ft makes the radar data storing portion 12 store the latest radar data set.

The regression curve calculating portion 13 reads out n of the radar data sets from the radar data storing portion 12 when it receives the notification of receiving the latest radar data set from the radar data storing processing portion 11. If the regression curve calculating portion 13 can not read out n of the radar data sets (i.e. if the number of the read out radar data sets is smaller than n), it carries out nothing.

On the other hand, when the regression curve calculating portion 13 can read out n of the radar data sets, it finds two regression functions comprising quadratic functions of time by the use of the read our radar data sets. The regression functions are representative of time variations of X and Y coordinates respectively.

For instance, the regression curve calculating portion 13 finds the regression functions as follows. Here, it is assumed that the radar data sets read out from the radar data storing portion 12 corresponds to symbols of "+" depicted on an illustrated X-Y coordinate system of FIG. 2.

First, the regression curve calculating portion 13 divides the radar data sets into X components and Y components. The X components and the Y components are shown in FIGS. 3 and 4, respectively, as functions of time.

Figure 3:
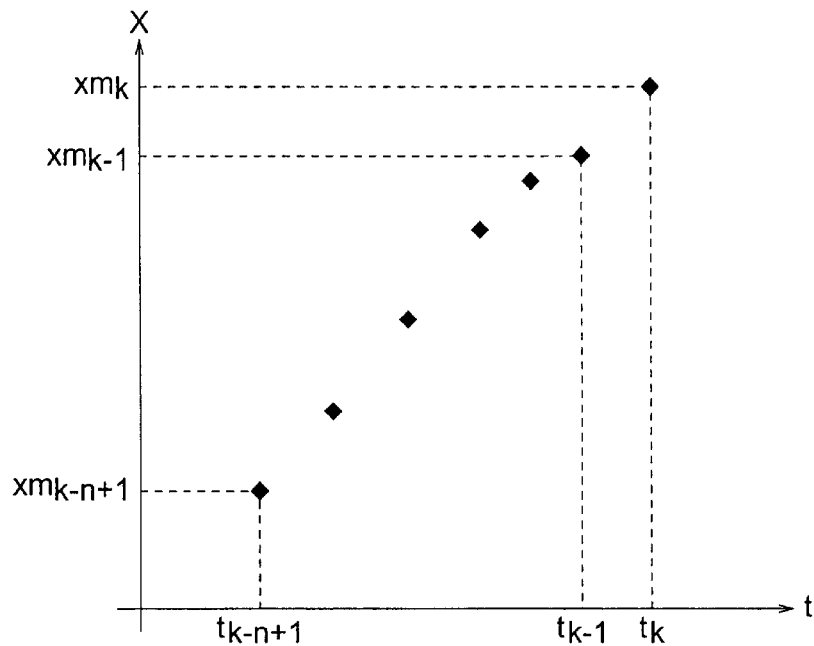
FIG. 3 shows time variation of the X coordinate of FIG. 2.
Figure 4:
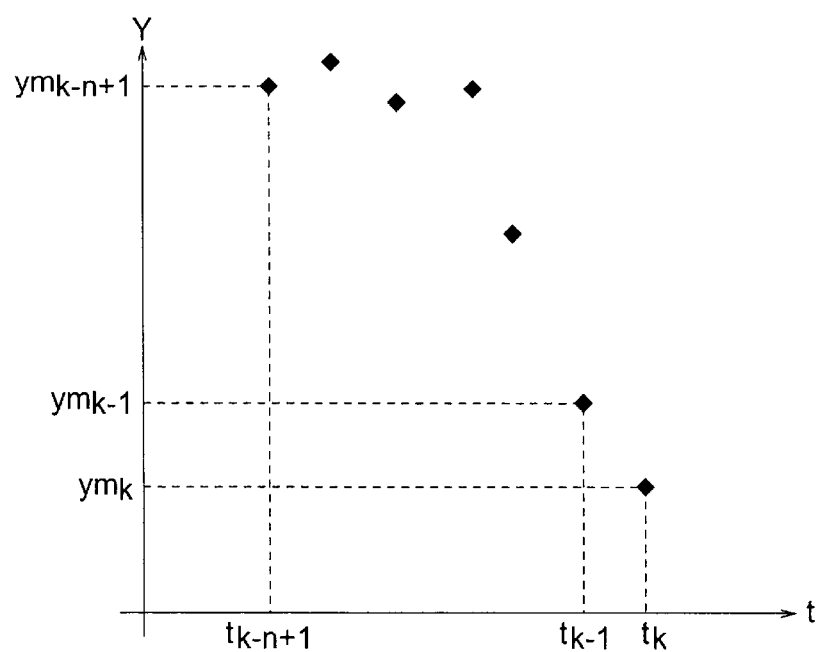
FIG. 4 shows time variation of the Y coordinate of FIG. 2.

Next, the regression curve calculating portion 13 finds a first regression (approximate or adapted) curve which passes on or by each black square depicted on FIG. 3. Similarly, the regression curve calculating portion 13 finds a second regression curve which passes on or by each black square depicted on FIG. 4. The regression curve calculating portion 13 uses, for example, a least-square method to find the first and the second regression curves. The first and the second regression curves are illustrated in FIGS. 5 and 6, respectively.

Figure 5:
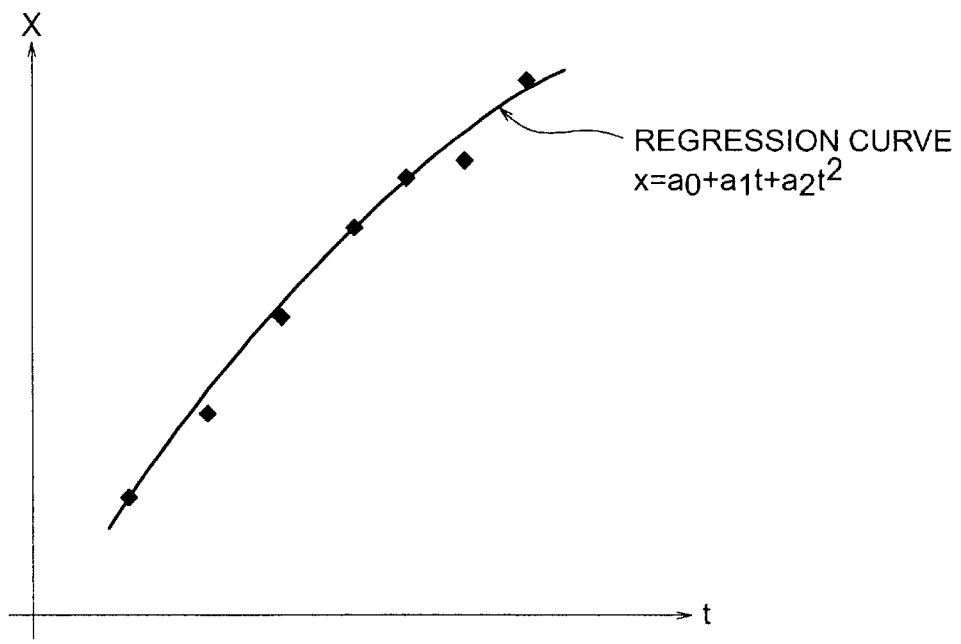
FIG. 5 shows a regression curve representing the time variation of the X coordinate of FIG. 3.
Figure 6:
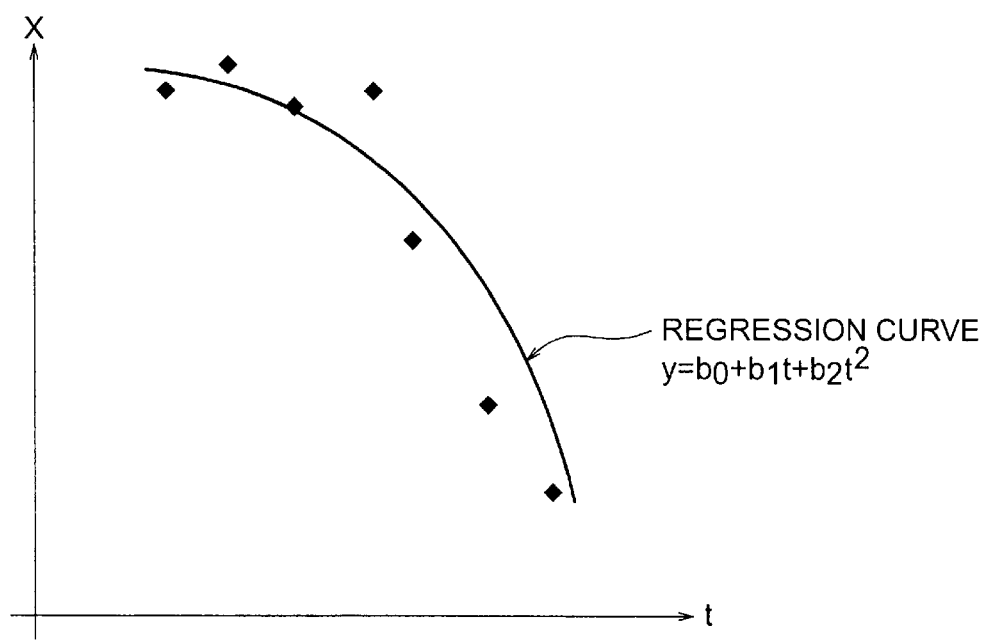
FIG. 6 shows a regression curve representing the time variation of the Y coordinate of FIG. 4.

Lastly, the regression curve calculating portion 13 finds a first regression equation of "$x=a_0+a_1 t+a_2 t^2$" corresponding to the first regression curve illustrated in FIG. 5 and a second regression equation of "$y=b_0+b_1 t+b_2 t^2$" corresponding to the second regression curve of FIG. 6.

Specifically, the regression curve calculating portion 13 finds coefficients $a_0$, $a_1$ and $a_2$ (i.e. a vector $A_k$) of the first regression equation and coefficients $b_0$, $b_1$ and $b_2$ (i.e. a vector $B_k$) of the second regression equation. The vectors Ak and Bk are given by the following Equations (1) and (2), respectively.

$$A_k = (a_0 \; a_1 \; a_2)^T \qquad (1)$$
$$= (F_{k,k-n+1}^T F_{k,k-n+1})^{-1} F_{k,k-n+1}^T X_{k,k-n+1}$$

$$B_k = (b_0 \; b_1 \; b_2)^T \qquad (2)$$
$$(F_{k,k-n+1}^T F_{k,k-n+1})^{-1} F_{k,k-n+1}^T Y_{k,k-n+1}$$

$$\text{Here, } F_{k,k-n+1} = \begin{pmatrix} F_{k-n+1} \\ F_{k-n+2} \\ \vdots \\ F_k \end{pmatrix},$$

$$X_{k,k-n+1} = (xm_{k-n+1} \; xm_{k-n+2} \; \cdots \; xm_k)^T,$$

$Y_{k,k-n+1}=(ym_{k-n+1} \; ym_{k-n+2} \; \ldots \; ym_k)^T$, and $F_1=(1 \; t_1 \; t_1^2)$. In addition, the symbol of "T" represents a transpose.

The regression curve calculating portion 13 supplies a vector signal representing the vectors $A_k$ and $B_k$ to the tracking data calculating portion 14.

When the tracking data calculating portion 14 receives the vector signal supplied from the regression curve calculating portion 13, it reads out the latest radar data set from the radar data storing portion 12 to obtain the latest detecting time $t_k$. Then the tracking data calculating portion 14 calculates a calculated latest X position (or a presumed latest X coordinate) on the first regression curve at the latest detecting time $t_k$ and a first latest inclination (a rate of time variation of the presumed latest X coordinate) of the first regression curve at the calculated latest X position. In other words, the tracking data calculating portion 14 finds a value, as the presumed latest X coordinate) of the first regression function at the latest detecting time $t_k$.

Furthermore, the tracking data calculating portion 14 calculates a calculated latest Y position (or a presumed latest Y coordinate) on the second regression curve at the latest detecting time $t_k$ and a second latest inclination (a rate of time variation of the presumed latest Y coordinate) of the second regression curve at the calculated latest Y position. In other words, the tracking data calculating portion 14 finds a value, as the presumed latest Y coordinate) of the second regression function at the latest detecting time $t_k$.

The calculated latest X and Y positions and the first and the second latest inclinations are collectively obtained by the use of the vectors $A_k$ and $B_k$ and the latest detecting time $t_k$. That is, they are given by Equation (3).

$$X = (x \; y \; \dot{x} \; \dot{y})^T \quad (3)$$

$$= \begin{pmatrix} F_k & O \\ O & F_k \\ \dot{F}_k & O \\ O & \dot{F}_k \end{pmatrix} \begin{pmatrix} A_k \\ B_k \end{pmatrix}$$

In the Equation (3), the symbol of "x" represents the calculated latest X position on the first regression curve at the latest detecting time $t_k$. The symbol of "y" represents the calculated latest Y position on the second regression curve at the latest detecting time $t_k$. The symbol of "$\dot{x}$" represents the rate of the time variation of the X components (or the first latest inclination of the first regression curve) at the calculated latest X position. The symbol of "$\dot{y}$" represents the rate of the time variation of the Y components (or the second latest inclination of the second regression curve) at the calculated latest Y position. In addition, O=(0 0 0), $F_k$=(1 $t_k$ $t_k^2$), and $\dot{F}$=(0 1 2$t_k$).

The calculated latest X and Y positions represent the presumed latest coordinates of the object on the predetermined X-Y coordinate system at the latest detecting time $t_k$. The first and the second latest inclinations represent the presumed latest velocity (or a combination of a presumed latest speed in a direction of the X axis and a presumed latest speed in a direction of the Y axis of the predetermined X-Y coordinate system) of the object.

The tracking data calculating portion 14 supplies a tracking data representing the presumed latest coordinates and the presumed latest velocity to the tracking data output unit 30.

The tracking data output unit 30 comprises a display unit such as a CRT, a flat display panel or the like. The tracking data output unit 30 displays the predetermined X-Y coordinate system. Furthermore, the tracking data output unit 30 additionally displays an object mark representing the presumed latest coordinates and a velocity mark representing the presumed latest velocity on the X-Y coordinate system whenever the tracking data is supplied from the tracking data calculating portion 14. Thus, the tracking data output unit 30 displays a series of object marks with velocity marks on the X-Y coordinate system displayed by the display unit 30.

As mentioned above, the existing tracking apparatus presumes the coordinates and the velocity of the object.

Figure 7:
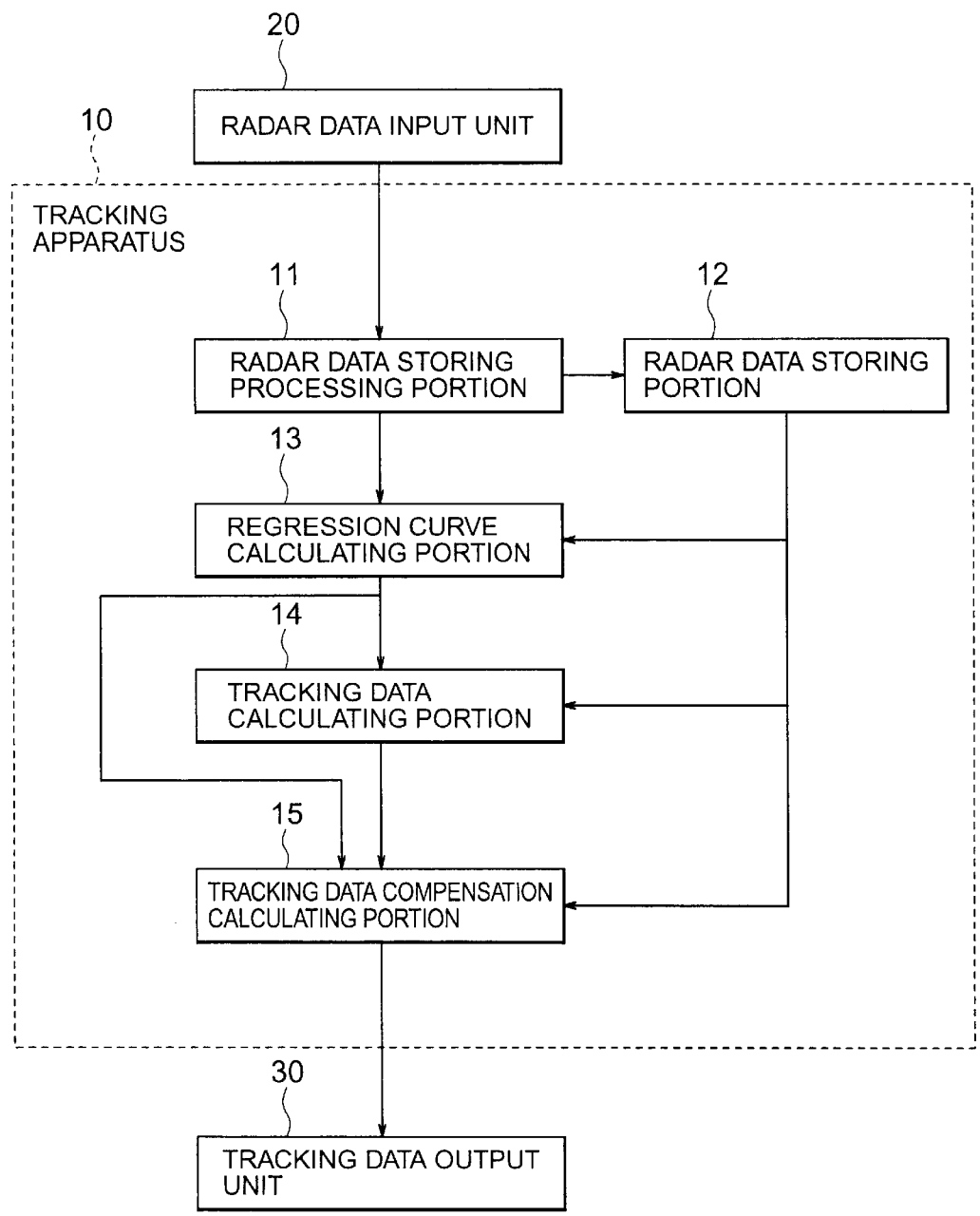
FIG. 7 is a block diagram of a tracking apparatus of an embodiment according to this invention.

Referring to FIG. 7, the description will proceed to a tracking apparatus according to a first embodiment of this invention. Similar parts are designated by like reference numerals.

In FIG. 7, the tracking apparatus 100 comprises a tracking data compensation calculating portion 15 in addition to the structure of the existing tracking apparatus 10 of FIG. 1. In this embodiment, the tracking data calculating portion 14 serves as a position presuming portion for presuming the presumed position of the object. Furthermore, the tracking data compensation calculating portion 15 serves as a velocity presuming portion for presuming the presumed traveling velocity of the object.

The tracking data compensation calculating portion 15 is connected to the radar data storing portion 12, the regression curve calculating portion 13, the tracking data calculating portion 14 and the tracking data output unit 30. The tracking data compensation calculating portion 15 operates as follows.

The tracking data compensation calculating portion 15 previously receives the vector signal supplied from the regression curve calculating portion 13. Then, the tracking data compensation calculating portion 15 operates like the tracking data calculating portion 14 when ft receives the tracking data supplied from the tracking data calculation portion 14. However, the tracking data compensation calculating portion 15 calculates a calculated former X position on the first regression curve at a former detecting time $t_k'$($t_{k-n+1}$<$t_k'$<$t_k$) and a calculated former Y position on the second regression curve at the former detecting time $t_k'$. Furthermore, the tracking data compensation calculating portion 15 calculates a first former inclination of the first regression curve at the calculated former X position and a second former inclination of the second regression curve at the calculated former Y position, The calculated former X and the Y positions and the first and the second former inclinations are given by Equation (4).

$$X' = (x' \; y' \; \dot{x}' \; \dot{y}')^T \quad (4)$$

$$= \begin{pmatrix} F_k' & O \\ O & F_k' \\ \dot{F}_k' & O \\ O & \dot{F}_k' \end{pmatrix} \begin{pmatrix} A_k \\ B_k \end{pmatrix}$$

In the Equation (4), the symbol of "x'" is the calculated former X position on the first regression curve at the former detecting time $t_k'$. The symbol of "y'" is the calculated former Y position on the second regression curve at the former detecting time $t_k'$. The symbol of "$\dot{x}'$" is the rate of the time variation of the X components (or the inclination of the first regression curve) at the calculated former X position. The symbol of "$\dot{y}'$" is the rate of the time variation of the Y components (or the inclination of the second regression curve) at the calculated former Y position. In addition, O=(0 0 0), $F_k'$=(1 $t_k'$ $t_k'^2$), $\dot{F}'$=(0 1 2$t_k'$), and $t_k'$=$\alpha t_k$+(1−$\alpha$)$t_{k-n+1}$, however, 0≦$\alpha$≦1.

The constant $\alpha$ of the Equation (4) is, for example, equal to 0.5. This is because there is high probability that the inclination of each regression curve at the middle is equal to the mean of the inclinations of the regression curve from the detecting time $t_{k-n+1}$ to the latest detecting time $t_k$ when the object moves at an uniform speed.

Next, the tracking data compensation calculating portion 15 combines the calculated latest X and Y positions calculated by the tracking data calculating portion 14 with the first and the second former inclinations calculated thereby to produce a compensated tracking data. The compensated tracking data are given by Equation (5).

$$X = \begin{pmatrix} HpX \\ HvX' \end{pmatrix} \quad (5)$$

Here, $Hp = \begin{pmatrix} 1 & 0 & 0 & 0 \\ 0 & 1 & 0 & 0 \end{pmatrix}$ and $Hv = \begin{pmatrix} 0 & 0 & 1 & 0 \\ 0 & 0 & 0 & 1 \end{pmatrix}$.

That is, the matrix Hp is for extracting the presumed coordinates while the matrix Hv is for extracting the presumed velocity.

Lastly, the tracking data compensation calculating portion 15 supplies the compensated tracking data representing the calculated latest X and Y positions at the latest detecting time $t_k$ and the first and the second former inclinations of the first and the second regression curves at the former detecting time $t_k'$ to the tracking data output unit 30. The latest X and Y positions represent the presumed coordinates. The first and the second former inclinations represent the presumed speeds in the X and the Y axes directions, respectively. When the presumed speeds in the X and the Y axes are considered to be vectors, a compound of the vectors represents the presumed azimuth or traveling direction of the object.

The tracking data output unit 30 displays the object marks and the velocity marks on the X-Y coordinate plane on the basis of the compensated tracking data successively supplied from the tracking data compensation calculating portion 15. The displayed picture displayed by the tracking data output unit 30 is different from that of the existing tracking apparatus 10 of FIG. 1. That is, the velocity presuming precision of the tracking apparatus 100 of FIG. 7 is improved in comparison with that of FIG. 1.

Referring to FIGS. 8 through 13, the description will be made about simulation results of tracking an aircraft by the use of the tracking apparatus 100.

Figure 8:
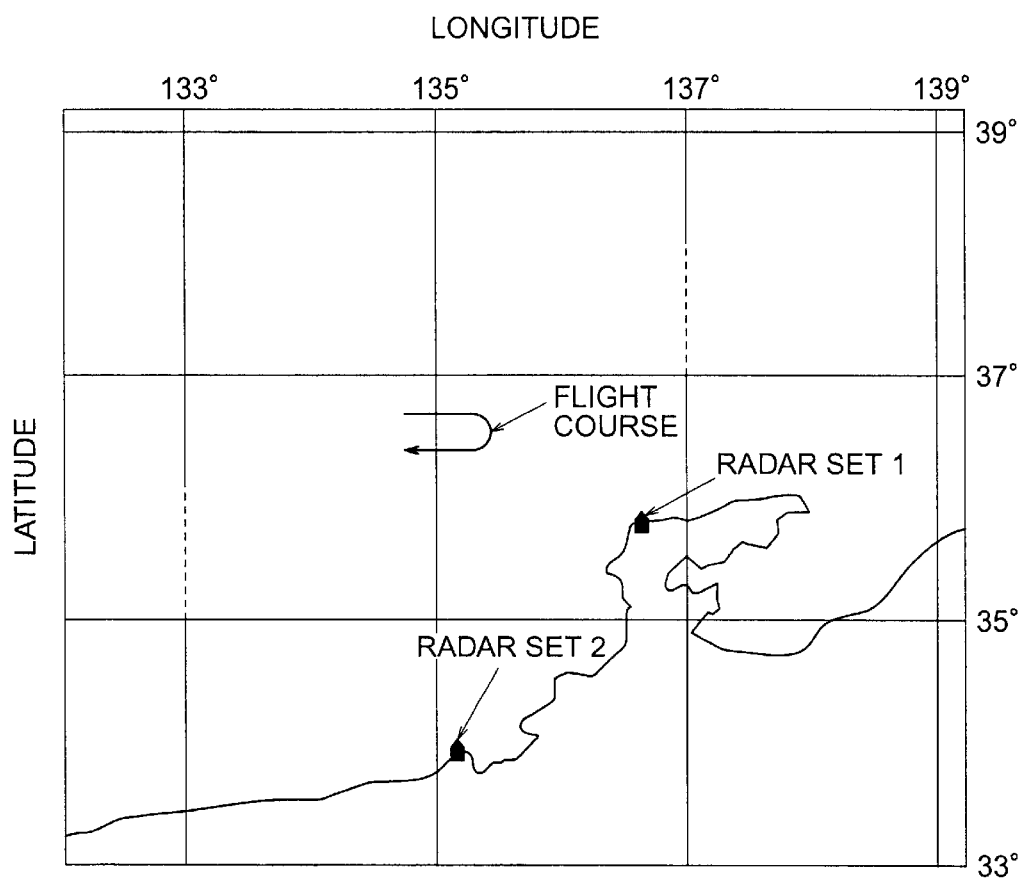
FIG. 8 is a schematic view showing positional relationships between object and radar sets which are connected to the tracking apparatus of FIG. 7.

FIG. 8 shows positional relationships between a flight course of the aircraft and a pair of radar sets 1 and 2. Here, it was assumed that the aircraft flied toward the east (or a right side on the sheet) at a speed of 500 knots for 120 seconds, took a turn to right with centripetal force of 3G (G: acceleration of gravity) for 27 seconds so that its traveling direction turned by about 180 degrees, and then flied toward the west (or a left side on the sheet) for 120 seconds. Each of the radar units 1 and 2 periodically measured the position of the aircraft which was flying as mentioned above. In this event, the radar units 1 and 2 alternately supplied radar data set to the tracking apparatus 100 at 6-second intervals.

Figure 9:
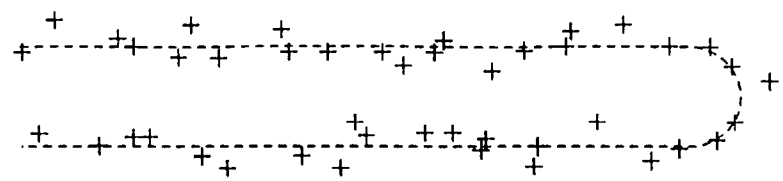
FIG. 9 shows relationships between a flight course of the object and detected positions of the object.

FIG. 9 shows the flight course on a predetermined X-Y coordinate system. In FIG. 9, a broken line corresponds to an actual flight course while each of symbols of "+" correspond to a radar data set at each time. Additionally, each of the radar set 1 and 2 has precision that errors of measured distance show normal distribution with the mean of 0 data mile and the standard deviation of 0.3 data mile and that errors of measured azimuths show normal distribution with the mean of 0 degree and the standard deviation of 0.2 degrees. Here, one data mile is equal to 6000 feet.

Figure 10:
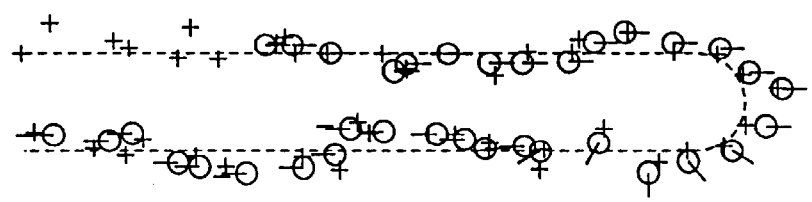
FIG. 10 shows a result of tracking made by the tracking apparatus of FIG. 7.

FIG. 10 shows the output (presumed results) of the tracking apparatus 100. In FIG. 10 each of symbols of "○" corresponds to presumed coordinates while a segment extending from the corresponding "○" symbol corresponds to a presumed velocity (speed and azimuth).

Figure 11A:
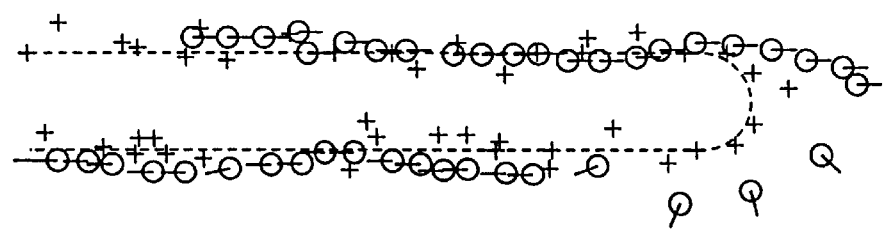
FIG. 11A shows a result of tracking made by a conventional tracking apparatus of an α-β system.
Figure 11B:
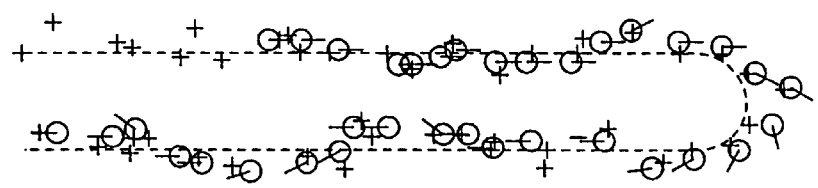
FIG. 11B shows a result of tracking made by a existing tracking apparatus of a regression curve adapting system.

For comparison with the output of the tracking apparatus 100, presumed results obtained by the use of a conventional a α-β system and an existing curve adapting system are illustrated in FIGS. 11A and 11B, respectively.

As shown in FIG. 11A, there are remarkable divergences between the presumed coordinates presumed by the α-β system and actual coordinates of the aircraft in a part of circular flight. On the other hand, it can be easily understood from FIG. 10 that the tracking apparatus 100 can presume the position of the aircraft with comparative accuracy though there are slight divergences between the presumed coordinates presumed by the existing curve adapting system and the actual coordinates of the aircraft. The presumed coordinates of the tracking apparatus 100 are identical to that of the existing curve adapting system because of the structure of the tracking apparatus 100. This is obvious from comparison between FIGS. 10 and 11B.

To clarify the improvement of the presuming precision of the tracking apparatus 100, the simulation mentioned above was repeated twenty times and the means and the standard deviations of the errors about the presumed positions and the presumed velocities of the aircraft at each time were found. The results are illustrated in FIGS. 12A–12C and 13A–13C.

FIG. 12A shows time variation of the mean of errors concerning the presumed positions together with that of the α-β system. FIG. 12B shows time variation of the mean of errors concerning the presumed speeds together with those of the α-β system and the existing regression curve adapting system. FIG. 12C shows time variation of the mean of errors concerning the presumed azimuths together with those of the α-β system and the existing regression curve adapting system. FIG. 13A shows time variation of the standard deviations of errors concerning the presumed positions together with that of the α-β system. FIG. 13B shows time variation of the standard deviations of errors concerning the presumed speeds together with those of the α-β system and the existing regression curve adapting system. FIG. 13C shows time variation of the standard deviation of errors concerning the presumed azimuths together with those of the α-β system and the existing regression curve adapting system. In each of FIGS. 12A–12C and 13A–13C, a single dotted chain line, a broken line and a solid line correspond to the tracking system 100, the existing regression curve adapting system and the α-β system, respectively. In each of FIGS. 12A and 13A, because the results of the tracking system 100 and the existing regression curve adapting system are identical to each other, the broken line represents those results.

FIGS. 12A and 13B also show the conclusion obtained from FIGS. 10, 11A and 11B. That is, both of the means and the standard deviation of the errors concerning the presumed positions are lower than those of the α-β system at almost all time.

FIGS. 12B and 13B show that the means and the standard deviation of the errors concerning the presumed speeds are comparatively approximate to those of the α-β system and different from those of the existing regression curve adapting method. Furthermore, deterioration of the presuming precision of the tracking apparatus 100 can not be admitted from FIGS. 12B and 13B.

FIGS. 12C and 13C show that the standard deviation of the errors concerning the presumed azimuths are remarkably lower than those of the existing regression curve adapting system though the means of the errors concerning the presumed azimuths are larger than those of the existing regression curve adapting system at the circular fright.

From these results, it is understood that the tracking apparatus 100 is improved about the presuming precision of the velocity without deterioration of the presuming precision of the position in comparison with the existing regression curve adapting system.

Next, the description is made about a tracking apparatus according to a second embodiment of this invention.

The tracking apparatus has the same structure as the tracking apparatus 100 of FIG. 7 except for an operation of the tracking data compensation calculating portion 15.

In this embodiment, the tracking data compensation calculating portion 15 calculates the first former inclination of the first regression curve and the second former inclination of the second regression curve at the former detecting time $t_k'$ ($t_{k-n+1} < t_k' < t_k$) as mentioned above. The first and the second former inclinations are corresponding to the presumed speeds in the X and the Y axes directions, respectively.

In addition, the tracking data compensation calculating portion 15 calculates the third former inclination of the first regression curve and the forth former inclination of the second regression curve at another former detecting time $t_k''$ (($t_{k-n+1} < t_k'' < t_k$, $t_k'' \neq t_k'$). The third and the forth former inclinations are used for finding the presumed azimuth of the object instead of the first and the second former inclinations. The third and the forth former inclinations are calculated by the use of the above mentioned Equation (4) and the other former detecting time $t_k''$ instead of the former detecting time $t_k'$.

By appropriately selecting the other former detecting time $t_k''$, the error of the presumed azimuth is reduced in comparison with the case that the first and the second former inclinations are used.

Furthermore, the tracking data compensation calculating portion 15 combines the first through the forth former inclinations with the latest coordinates calculated by the tracking data calculating portion 14 to supply them for the tracking data output unit 30 as the compensated tracking data.

While this invention has thus far been described in conjunction with a few embodiments thereof, it will readily be possible for those skilled in the art to put this invention into practice in various other manners. For example, the tracking data compensation calculating portion 15 of the second example may calculate Equation (6).

$$X^* = (x^* \ y^* \ \dot{x}^* \ \dot{y}^*)^T \quad (6)$$

$$= \frac{X'(X''^T H_v^T H_v X'')^{\frac{1}{2}}}{(X'^T H_v^T H_v X')^{\frac{1}{2}}}$$

In the Equation (6), the symbol of "x*" is a calculated X position on the first regression curve at a certain detecting time. The symbol of "y*" is a calculated Y position on the second regression curve at the certain detecting time. The symbol of "$\dot{x}^*$" is the rate of the time variation of the X components (or the inclination of the first regression curve) at the calculated X position. The symbol of "$\dot{y}^*$" is the rate of the time variation of the Y components (or the inclination of the second regression curve) at the calculated Y position. In addition, $$X' = \begin{pmatrix} F_k' & O \\ O & F_k' \\ \dot{F}_k' & O \\ O & \dot{F}_k' \end{pmatrix} \begin{pmatrix} A_k \\ B_k \end{pmatrix}, \quad X'' = \begin{pmatrix} F_k'' & O \\ O & F_k'' \\ \dot{F}_k'' & O \\ O & \dot{F}_k'' \end{pmatrix} \begin{pmatrix} A_k \\ B_k \end{pmatrix},$$

$$O = (0 \ 0 \ 0), \quad F_k' = (1 \ t_k' \ t_k'^2),$$

$\dot{F}'_k = (0\ 1\ 2t_k')$, $F''_k = (1\ t_k''\ t_k''^2)$, $\dot{F}''_k = (0\ 1\ 2t_k'')$, $t_k' = \alpha t_k + (1-\alpha) t_{k-n+1}$, $0 \leq \alpha \leq 1$, $t_k'' = \beta t_k + (1-\beta) t_{k-n+1}$, $0 \leq \beta \leq 2$, and $\beta \neq \alpha$.

If the detecting times of $t_k'$ and $t_k''$, are appropriately selected, the Equation (6) provides the presumed speeds and the presumed azimuths with high precision at a time. Accordingly, it becomes unnecessary that the tracking data compensation calculating portion 15 individually calculates the presumed speeds and the presumed azimuths like the second embodiment. That is, the operation of the tracking data compensation calculating portion 15 is simplified in comparison with that of the second example.

In this case, the tracking data calculating portion 15 uses the above mentioned Equation (5) to produce the compensated tracking data representative of the calculated latest coordinates and the calculated velocity.

What is claimed is:

1. A tracking apparatus for tracking an object by the use of a plurality of detecting data sets which are successively supplied from a detecting device and finding a presumed position and a presumed velocity of said object at the latest detecting time of said detecting data sets, said tracking apparatus comprising;

regression curve calculating portion for finding two regression functions individually corresponding to time variation of X and Y coordinates of said object on a predetermined X-Y coordinate system by the use of said detected data sets, position presuming portion connected to said regression curve calculating portion for finding said presumed position by the use of said regression functions and the latest detecting time, and velocity presuming portion connected to said regression curve calculating portion for finding said presumed velocity by the use of said regression functions and at least one of the other detecting times of said detected data sets.

2. A tracking apparatus as claimed in claim 1, wherein said velocity presuming portion finds a speed and an azimuth of said object as said presumed velocity by the use of a first detecting time as the other detecting time different from the latest detecting time.

3. A tracking apparatus as claimed in claim 2, wherein said speed corresponds to varying rates of said regression functions at the latest detecting time, said azimuth found by the use of said varying rates.

4. A tracking apparatus as claimed in claim 1, wherein said velocity presuming portion finds a speed and an azimuth of said object as said presumed velocity by the use of first and second detecting times as the other detecting times, said first and said second detecting times being different from the latest detecting time and from each other.

5. A tracking apparatus as claimed in claim 4, wherein said first detecting time is used for finding said speed while said second detecting time is used for finding said azimuth.

6. A tracking apparatus as claimed in claim 5, wherein said speed corresponds to first varying rates of said regression functions at said first detecting time, said azimuth found by the use of second varying rates of said regression functions at said second detecting time.

7. A tracking apparatus as claimed in claim 4, wherein each of said first and said second detecting times are used for finding both of said speed and said azimuth.

8. A tracking apparatus as claimed in claim 1, wherein each of said regression functions comprises a quadratic function of time.

9. A tracking apparatus as claimed in claim 1, wherein said tracking apparatus further comprises a data storing portion connected to said detecting device and said regression curve calculating portion for storing later n of said detected data sets to supplies said detected data sets for said regression curve calculating portion.

10. A tracking method for tracking an object by the use of a plurality of detecting data sets which are successively supplied from a detecting device and finding a presumed position and a presumed velocity of said object at the latest detecting time of said detecting data sets, said tracking method comprising the steps of:

finding two regression functions individually corresponding to time variation of X and Y coordinates of said object on a predetermined X-Y coordinate system by the use of said detected data sets, finding said presumed position by the use of said regression functions and the latest detecting time, and finding said presumed velocity by the use of said regression functions and at least one of the other detecting times of said detected data sets.

11. A tracking method as claimed in claim 10, wherein the finding step for finding said presumed velocity is for finding a speed and an azimuth as said presumed velocity by the use of a first detecting time as the other detecting time different from the latest detecting time.

12. A tracking method as claimed in claim 11, wherein the finding step for finding said presumed velocity comprises the steps of:

finding varying rates of said regression functions at the latest detecting time as said speed, and finding said azimuth by the use of said varying rates.

13. A tracking method as claimed in claim 10, wherein the finding step for finding said presumed velocity is for finding a speed and an azimuth as said presumed velocity by the use of first and second detecting times as the other detecting times, said first and said second detecting times being different from the latest detecting time and from each other.

14. A tracking method as claimed in claim 13, wherein said first detecting time is used for finding said speed while said second detecting time is used for finding said azimuth.

15. A tracking method as claimed in claim 14, wherein the finding step for finding said presumed velocity comprises the steps of:

finding varying rates of said regression functions at said first detecting time as said speed, and finding said azimuth by the use of varying rates of said regression functions at said second detecting time.

16. A tracking method as claimed in claim 13, wherein each of said first and said second detecting times are used for finding both of said speed and said azimuth.

17. A tracking method as claimed in claim 10, wherein each of said regression functions comprises a quadratic function of time.

18. A tracking method as claimed in claim 10, wherein said tracking method further comprises the steps of:

storing later n of said detected data sets supplied from said detecting device in a storing portion, and supplying n of said detected data sets from said storing portion to said regression curve calculating portion.

19. A tracking method as claimed in claim 10, wherein the finding step for finding said regression functions is carried out by the use of a determinant.

20. A tracking method as claimed in claim 10, wherein the finding step for finding said velocity is carried out by the use of a determinant.

* * * * *